No. 855,924. PATENTED JUNE 4, 1907.
R. W. BEATON.
FASTENER FOR PIPE AND CONDUIT SUPPORTS.
APPLICATION FILED JUNE 30, 1906.
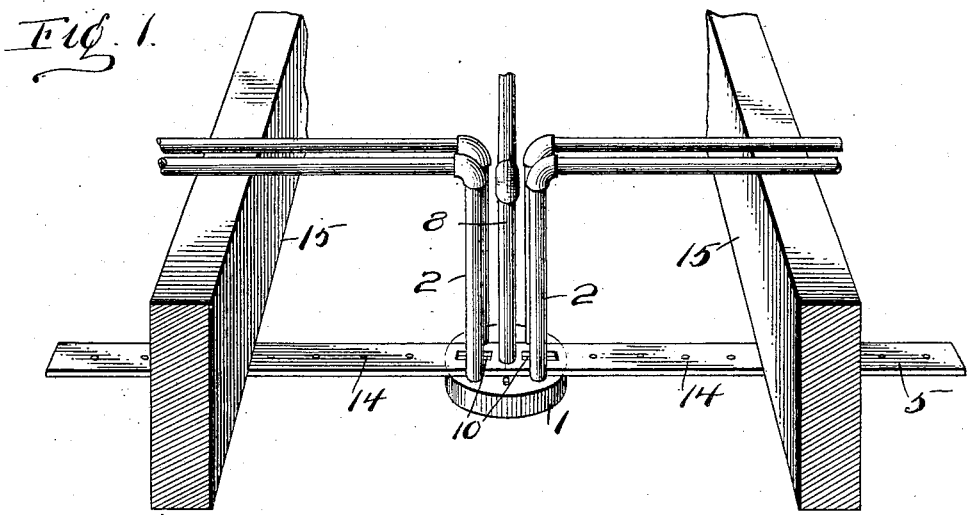
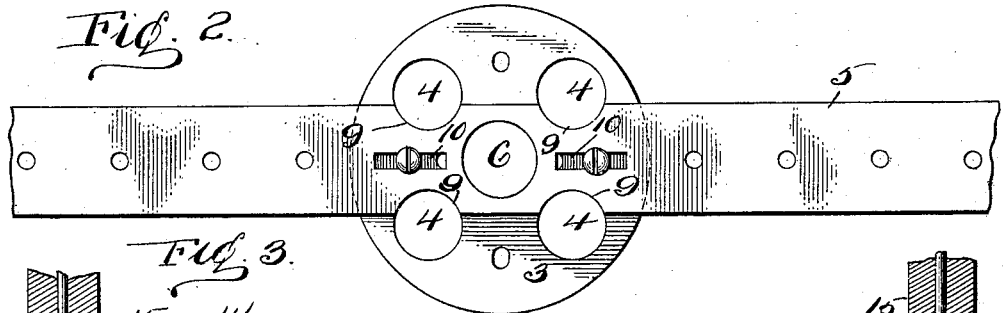
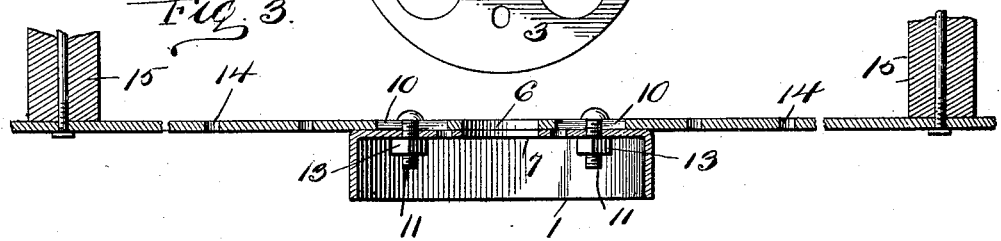
Witnesses
Inventor
Robert W. Beaton
by Attorneys.

UNITED STATES PATENT OFFICE.

ROBERT W. BEATON, OF CHICAGO, ILLINOIS.

FASTENER FOR PIPE AND CONDUIT SUPPORTS.

No. 855,924.            Specification of Letters Patent.            Patented June 4, 1907.

Application filed June 30, 1906. Serial No. 324,211.

*To all whom it may concern:*

Be it known that I, ROBERT W. BEATON, a citizen of the United States of America, residing at Chicago, in the county of Cook and State of Illinois, have invented certain new and useful Improvements in Fasteners for Pipe and Conduit Supports, of which the following is a specification, reference being had therein to the accompanying drawing.

This invention relates to fasteners for pipe and conduit supports, and its primary object is to provide a simple, inexpensive and convenient device for securing the box or casing employed in buildings as a support for electric wire conduits.

A further object of the invention is to provide an improved fastening device which will serve as a support for the encasing pipes or conduits for electric wires, and also as a fastener for a gas pipe.

The construction of the improvement will be fully described hereinafter, in connection with the accompanying drawing which forms part of this specification, and its novel features will be defined in the appended claims.

In the drawing, Figure 1 is a view in perspective of a fastener constructed in accordance with my invention, showing it applied to a box and to parallel joists of a building, Fig. 2 is a top plan view of the fastener applied to a box or casing for supporting pipes or conduits, Fig. 3 is a central longitudinal sectional view of the same, Fig. 4 is a top plan view of the box removed.

The reference numeral 1 designates a metallic box or casing serving as a support for a plurality of pipes 2 adapted to incase electric conducting wires within a building, the body or disk portion 3 of the casing being formed with radially disposed circular openings 4 for the passage of the pipes. Heretofore, this box or casing has been secured by nailing a piece of timber between the joists in a building but my improvement avoids the use of this securing timber and provides a hanger or fastener for suspending the box between two adjacent joists without regard to the distance they are apart, and the construction of the fastener is such that it may be employed with boxes of different size.

The fastener consists of a strip 5 of metal formed with a central circular opening 6 registering with a similar opening 7 in the box for the passage of a gas pipe 8. The opposite edges of the strip 5 are formed with semi-circular recesses 9, conforming to the inner sides of the circular openings 4 in the box through which the electric wire pipes 2 extend. On either side of the central opening 6 the strip is provided with a longitudinally disposed elongated slot 10, through which extend bolts 11, which also extend through small openings 12 in the box and are secured by nuts 13. The strip 5 is also formed with a row of screw-holes 14 on each side of the elongated slots 10, thus adapting the fastener to be secured by suitable screws to the under sides of two contiguous joists 15 where the distance between the joists does not exceed the length of the strip.

The heads of the bolts 12 overlap the side walls of the slots 10 as shown and the nuts 13 firmly clamp the box and strip 5 together. The box is suspended between the joists at any point desired, and it serves as a support for the gas pipe 8 as well as for the wire conduit pipes 2. The position of the box is such that the edge of the depending rim will lie flush with the finished ceiling in a room. The pipes 2 may be secured by lock nuts thereon above and below the desk portion of the box.

What I claim and desire to secure by Letters Patent, is:—

1. In a device of the character described, the combination with a box formed in its top with a central opening and with a plurality of similar openings arranged around the central opening, of a fastening strip separate from the box and formed throughout its length with spaced openings and having a centrally arranged opening registering with the central opening of the box, the said strip having notched side edges registering with the openings arranged around the central opening in the box top, said strip having a longitudinally-extending slot at each side of the central opening in said strip, and bolts passed through said slots and through the box top for securing said box to said strip and permitting its adjustment longitudinally of the strip.

2. In a device of the character described a supporting box formed in its top with a plurality of pipe receiving openings, combined with a securing strip resting on the box top, said securing strip having slots extending longitudinally of the strip, and bolts passed through said slots and through the box top for securing the box to the strip and permitting the adjustment of the box longitudinally of the strip.

In testimony whereof I affix my signature in the presence of two witnesses.

ROBERT W. BEATON.

Witnesses:
C. E. McClun.
W. E. Elliott.